UNITED STATES PATENT OFFICE.

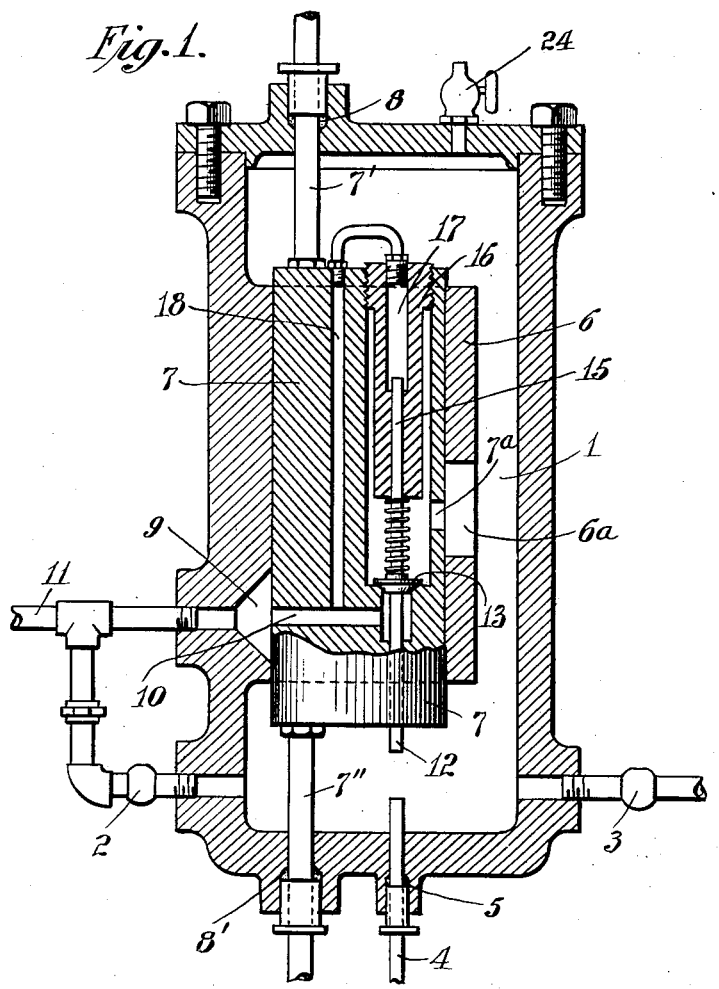
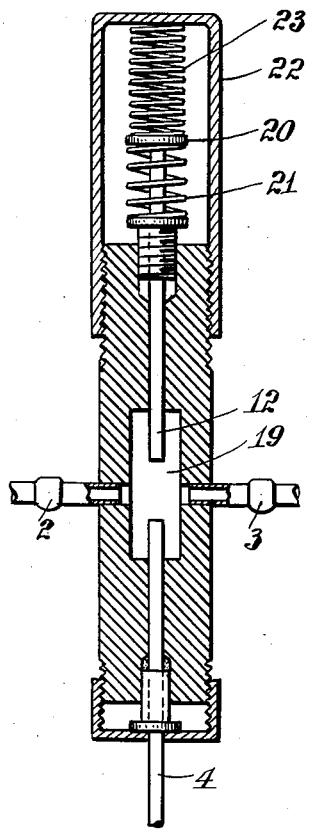

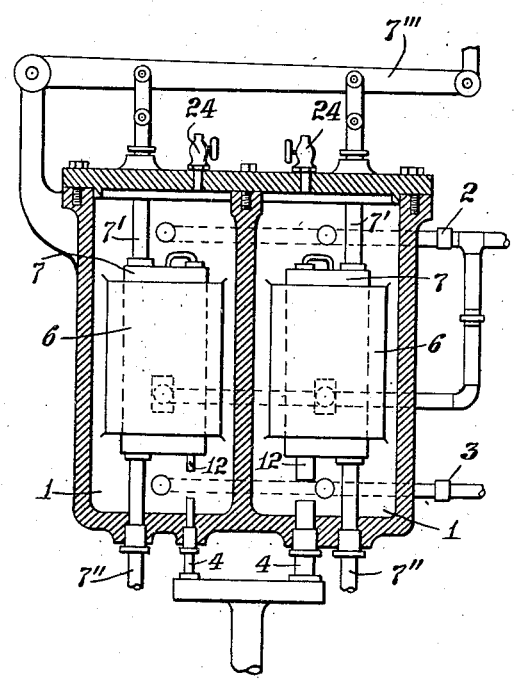

ROBERTSON MATTHEWS, OF ITHACA, NEW YORK.

LIQUID-MEASURING DEVICE.

1,325,102.    Specification of Letters Patent.    Patented Dec. 16, 1919.

Application filed August 12, 1918. Serial No. 249,466.

*To all whom it may concern:*

Be it known that I, ROBERTSON MATTHEWS, a citizen of the United States of America, and a resident of Ithaca, county of Tompkins, State of New York, have invented Liquid-Measuring Devices, of which the following is a specification.

My invention relates to improvements in devices for measuring liquids, and while particularly intended as a fuel-feeding and fuel-measuring device for internal combustion engines, particularly of the type in which the fuel is injected as a spray into the engine cylinder, yet my invention is applicable to other purposes; for example, the accurate measuring of gasolene delivered by gasolene vending machines, the accurate supply of reagents in chemical processes, such, for example, as the accurate supply of anti-scaling compounds to boiler feed water, the accurate supply of purifying agents to potable water, etc.

My invention consists in means, such as hereinafter described, whereby the volume of delivery per stroke may be regulated accurately and while the apparatus is in operation, and in other features, all as hereinafter described and as pointed out in the appended claims.

The object of my invention is to give positive and close control of the rate of liquid discharge for any rate intermediate zero discharge and one hundred per cent. capacity discharge, also to make the apparatus simple, relatively inexpensive, and reliable.

I will now proceed to describe my invention with reference to the accompanying drawings, in which:

Figure 1 shows a central longitudinal section of one form of liquid measuring device embodying my invention, and Fig. 2 shows a similar section of an alternative simplified form of apparatus.

Fig. 3 shows a vertical section of an apparatus comprising two measuring devices such as shown in Fig. 1, with displacement plungers of unequal cross-section and nullifying plungers corresponding thereto and so arranged that the displacement plungers come into and out of action successively, the section of Fig. 3 being taken on a plane at right angles to that of Fig. 1, and the scale of said Fig. 3 being smaller.

The apparatus herein described depends for its operativeness upon the following premises:

1 (*a*) Given a vessel containing a liquid and having a rod of uniform cross-section passing through the liquid and through non-leakage joints in the walls of such vessel, this rod may be moved back and forth without causing any change in the level of the liquid and without causing flow into or discharge from such vessel.

2 (*b*) If this aforementioned liquid have submerged in it a solid body, (of the same temperature as the liquid), this body can be moved about below the surface of the liquid without changing the level of the liquid.

Referring first to Fig. 1:

Numeral 1 designates a chamber provided with an inlet check valve 2 and with an outlet check valve 3. 4 designates a pump plunger movable in and out with respect to chamber 1, as is common in the case of pump plungers; 5 designates a stuffing box in which this plunger 4 works.

The plunger may be driven by any suitable means; in case the device herein described is used as a fuel-feeding and fuel-measuring device for engines, the plunger will naturally be driven by a cam, crank pin or eccentric driven by the engine. In case the device herein described is used for the accurate measuring of reagents, etc., this plunger may be operated either by hand or by automatic means. For present purposes, it does not matter by what means the plunger is operated.

6 designates a boss, projecting from one wall of the chamber 1, and usually filling a considerable portion of such chamber, within which boss there is a hollow bore in which is fitted a valve-block 7. This block is arranged to be reciprocated for purposes of adjustment by two rods 7' and 7", passing through suitable stuffing boxes 8 and 8' in the walls of chamber 1, one of which rods 7' and 7" is a dummy, the other being connected to adjusting or calibrating means of any suitable character; for example, (in case the device is used for the supply of fuel to an engine) to a governor driven by the engine. In a wall of chamber 1 there is a port 9, with which registers a port or duct 10 of the block 7; said port 9 being, preferably, of a width, such that it may register with port 10 in all positions of the block 7; and this port 9 is connected by a by-pass around the check valve 2, to the supply pipe 11, which is connected to the check valve 2, and so to chamber 1. The block 7 carries a valve-stem 12, in line with, and preferably of the same diameter as, the pump plunger; and this valve stem 12 carries a spring actuated valve 13, which, when seated, closes one end of the duct 10 in the valve block 7. Above this valve 13 there is an open space in the valve block communicating, by the port 7ª of the valve block and by registering port 6ª in the boss 6, with the interior of cylinder 1. Said valve 13 has also an upper stem 15 passing through suitable guide bore in a bushing 16 fitted within a suitable aperture of the valve block 7, and above this upper valve stem there is an open space 17 communicating by a duct 18 with duct 10 of the valve block.

The operation of the device of Fig. 1, as thus far described, is as follows:

Suppose for the moment that valve block 7 is stationary, and that plunger 4 be reciprocating. In the inward motion of such plunger liquid within chamber 1 will be displaced by the plunger, and forced out through discharge check valve 3, until such plunger comes in contact with, and lifts, valve stem 12. As soon as this valve opens, check valve 3 immediately closes, for there is a path for escape of the liquid through ports 7ª and 6ª and past said valve into duct 10, and thence into supply pipe 11; and not even the rise of valve stems 12 and 15 causes discharge from chamber 1, because, as the valve stems rise, there is displacement from chamber 17 through ducts 18 and 10 into the supply pipe. Therefore, continued inward movement of plunger 4 causes no further displacement from chamber 1. On the return stroke of said plunger, however, after the seating of valve 13 and the separation of plunger 4 from valve stem 12, further outward movement of plunger 4 causes liquid to be drawn through check valve 2 into chamber 1.

Should valve block 7 move toward plunger 4 while valve 13 is open, then slight displacement of liquid within chamber 1, due to the combined action of valve block 7 and plunger 4, will occur (equal in amount to the cross-section of valve stem 12 multiplied by the distance of movement of said valve stem with respect to valve block 7), and a corresponding amount of liquid will flow into chamber 1 through port 9, duct 10, and registering ports 7ª and 6ª. The result will be a return, during each cycle of the pump, to conditions within chamber 1 as uniform, as regards pressure and presence of liquid, as would exist in case valve block 7 were not moved. Should valve block 7 move away from plunger 4 while valve 13 is open, a slight amount of liquid will be forced out of chamber 1, past valve 13, through duct 10 into supply pipe 11.

In Fig. 1, I have not attempted to show the proportions of the parts which would be used in actual practice, but have merely shown the device schematically. Valve stems 12 and 15 together constitute what may be termed a "nullifying plunger," by means of which displacing effect of inward motion of plunger 4 is nullified after stems 12 and 15 have been "picked up" by plunger 4.

It will be seen that by this device, shown in Fig. 1, positive delivery of liquid from chamber 1 through discharge check valve 3 occurs, during inward motion of the plunger 4, until that plunger encounters valve stem 12, and that then this delivery ceases absolutely and instantaneously, because further movement of the plunger 4 causes no further displacement of the liquid in chamber 1. It will be seen, also, that the volume of liquid, displaced during each stroke of the plunger, is readily regulable, since for such regulation all that is required is movement of valve block 7 in one direction or the other. The structure shown, therefore, lends itself readily to manual adjustment for volume of discharge per stroke, or to governor adjustment for volume of discharge per stroke.

In Fig. 2, I illustrate an alternative and simplified device for the same purpose. In this figure, 19 is the chamber into which the liquid is drawn through supply check valve 2 and out of which liquid is discharged through discharge check valve 3 by means of a pump plunger 4; which plunger may be actuated by means, such as hereinbefore described, with reference to plunger 4 of Fig. 1. Above this plunger 4 there is another plunger or valve stem 12, preferably of the same diameter as plunger 4, and at the upper end of this plunger or stem 12 there is a collar 20. Plunger or stem 12 may be adjusted in position by regulation of pressure of a spring 21, which regulation may be obtained by turning a cover cap 22 (which screws upon the block containing chamber 19) and thereby compressing a spring 23, which opposes spring 21. In this construction there is no valve similar to valve 13. Discharge through check valve 3 ceases the instant plunger 4 encounters plunger 12 and intake through check valve 2 occurs the instant plunger 4 leaves plunger 12.

It will be observed that in the construction shown in Fig. 1, the valve stem 15 (which is functionally and in effect a continuation of valve stem 12 and a part thereof) moves in and out of chamber 1 just as truly as, in Fig. 2, valve stem 12 moves in and out of chamber 19; for the space 17 into which stem 15 of Fig. 1 retreats, though physically located within chamber 1, is not in effect so located, but rather is to be considered an inclosure separate from chamber 1 and in effect outside thereof. Except for the provision for adjustment of volume of discharge per stroke, this chamber 17 might be entirely outside of chamber 1, just as the chamber containing springs 21 and 22 of Fig. 2, is outside of chamber 19.

It is convenient to provide an air vent for chamber 1 (Fig. 1) or chamber 19 (Fig. 2), and therefore I have indicated vent cocks 24 for this purpose.

Obviously a plurality of these liquid measuring and delivery devices may be used together and coöperatively; and this is illustrated in Fig. 3, wherein two such devices, in this case of the construction shown in Fig. 1, are shown arranged for joint coöperative action. The displacement plungers 4 of these devices are arranged for simultaneous motion, but are of different cross-sections, as are their corresponding nullifying plungers 12; and moreover the larger displacement plunger 4 and its nullifying plunger 12 are arranged to come together, on the in stroke, earlier than do the smaller displacement plunger and corresponding nullifying plunger; the result being that outflow of liquid from the one device ceases earlier than does the outflow of liquid from the other device. During the out stroke the reverse action occurs; viz., the smaller displacement plunger and corresponding nullifying plunger separate earlier than do the larger plunger, and therefore inflow of liquid into the device having the smaller plungers begins earlier than into the device having the larger plungers.

By employing a plurality of coöperating devices of my invention, with differing rates of delivery and, if desired, different points of going out of and coming into action, very nice gradations of delivery may be obtained.

In Fig. 3 I have illustrated both rods 7' as connected, for adjustment, to the same lever 7''', so that both valve blocks 7 may be adjusted simultaneously by the same governor or other adjusting device.

What I claim is:

1. A liquid measuring and delivering device, comprising a chamber having inlet and outlet means, in combination with a pump plunger movable into and out of said chamber, and means for nullifying varying displacement of such plunger due to its movement, during a portion of the stroke of said plunger.

2. A liquid measuring and delivering device, comprising a chamber having inlet and outlet means, in combination with a pump plunger movable into and out of said chamber, and means for nullifying varying displacement of such plunger due to its movement, during a portion of the stroke of said plunger, and means for varying the point in the stroke of said pump plunger at which such nullifying action begins.

3. A liquid measuring and delivery device comprising a chamber having inlet and outlet means, a pump plunger movable in such chamber in such manner that the volume occupied varies, and another plunger of approximately the same cross sectional area as such pump plunger, and arranged to be caused to retreat out of such chamber when such pump plunger has reached a predetermined point in its movement in one direction, such second plunger arranged to move back into said chamber with such pump plunger in the motion of the latter in the opposite direction, and to cease such motion when the pump plunger has reached a predetermined point.

4. A liquid measuring and delivery device comprising a chamber having inlet and outlet means, a pump plunger movable in such chamber in such manner that the volume occupied varies, and another plunger of approximately the same cross sectional area as such pump plunger, and arranged to be caused to retreat out of such chamber when such pump plunger has reached a predetermined point in its movement in one direction, such second plunger arranged to move back into said chamber with such pump plunger in the motion of the latter in the opposite direction, and to cease such motion when the pump plunger has reached a predetermined point, and means for varying the point at which the second plunger begins to and ceases from movement.

5. A liquid measuring and delivery device comprising a chamber having inlet and outlet means, a pump plunger movable in such chamber in such manner that the volume occupied varies, and another plunger of approximately the same cross sectional area as such pump plunger, and arranged to be encountered by said pump plunger and pushed back when said pump plunger has reached a predetermined point in its movement in one direction, and to follow the pump plunger in the movement of the latter in the opposite direction, until a predetermined point is reached.

6. A liquid measuring and delivery device comprising a chamber having inlet and outlet means, a pump plunger movable in such chamber in such manner that the volume occupied varies, and another plunger of approximately the same cross sectional area as such pump plunger, and arranged to be encountered by said pump plunger and pushed back when said pump plunger has reached a predetermined point in its movement in one direction, and to follow the pump plunger in the movement of the latter in the opposite direction, until a predetermined point is reached, and means for varying the point at which the second plunger begins to and ceases from movement.

7. In a liquid measuring and delivery device, the combination with a pump chamber having supply and delivery means, and a pump plunger movable into and out of said chamber, of a nullifying plunger of substantially the cross-sectional area of said pump plunger, and arranged in line with said pump plunger and positioned to be pushed back by said pump plunger during inward movement of the latter, after a predetermined point in the stroke of said pump plunger, and to follow the outward movement of said pump plunger until a predetermined point in the stroke of said pump plunger has been reached.

8. In a liquid measuring and delivery device, the combination with a pump chamber having supply and delivery means, and a pump plunger movable into and out of said chamber, of a nullifying plunger of substantially the cross-sectional area of said pump plunger, and arranged in line with said pump plunger and positioned to be pushed back by said pump plunger during inward movement of the latter, after a predetermined point in the stroke of said pump plunger, and to follow the outward movement of said pump plunger until a predetermined point in the stroke of said pump plunger has been reached, and means for varying the point at which motion of said nullifying plunger begins and ends.

9. In a liquid measuring and delivery device, the combination with a pump chamber having supply and delivery means, of a pump plunger movable into and out of said chamber, and a nullifying plunger in line with said pump plunger and arranged to be encountered and moved back by the pump plunger during the inward stroke of the latter, said nullifying plunger likewise movable into and out of said chamber, and elastic pressure means tending to cause said nullifying plunger to follow outward movement of the pump plunger.

10. In a liquid measuring and delivery device, the combination with a pump chamber having supply and delivery means, of a pump plunger movable into and out of said chamber, and a nullifying plunger in line with said plunger and arranged to be encountered and moved back by the pump plunger during the inward stroke of the latter, said nullifying plunger likewise movable into and out of said chamber, and elastic pressure means tending to cause said nullifying plunger to follow outward movement of the pump plunger, and means for varying the point at which engagement of the pump plunger with the nullifying plunger begins and ends.

11. In a liquid measuring and delivery device, the combination with a pump chamber having supply and delivery means, a valve block mounted in a bearing in said chamber to move therein, and a pump plunger movable into and out of said chamber, said valve block having a duct leading from inlet means of said chamber to the interior of said chamber, a valve, carried by said valve block, arranged to open and close said duct, and a nullifying plunger, also carried by said valve block and arranged to be encountered and moved back by said pump plunger during the inward stroke of the latter, and to follow said pump plunger during outward motion of the latter, said nullifying plunger arranged to open said valve by its motion in one direction and to close said valve by its motion in the opposite direction.

12. In a liquid measuring and delivery device, the combination with a pump chamber having supply and delivery means, a valve block mounted in a bearing in said chamber to move therein, and a pump plunger movable into and out of said chamber, said valve block having a duct leading from inlet means of said chamber to the interior of said chamber, a valve, carried by said valve block, arranged to open and close said duct, and a nullifying plunger, also carried by said valve block and arranged to be encountered and moved back by said pump plunger during the inward stroke of the latter, and to follow said pump plunger during outward motion of the latter, said nullifying plunger arranged to open said valve by its motion in one direction and to close said valve by its motion in the opposite direction, and means for moving said valve block within said chamber to vary the point at which said nullifying plunger begins and ends its movement.

13. In a liquid measuring and delivery device, the combination with a pump chamber having supply and delivery means, a valve block mounted in a bearing in said chamber to move therein, and a pump plunger movable into and out of said chamber, said pump chamber having a broad inlet port, other than the main supply means, and connected to supply, said valve block having a duct leading from such broad inlet port to the interior of said chamber, a valve, carried by said valve block, arranged to open and close said duct, and a nullifying plunger, also carried by said valve block and arranged to be encountered and moved back by said pump plunger during the inward stroke of the latter, and to follow said pump plunger during outward motion of the latter, said nullifying plunger arranged to open said valve by its motion in one direction and to close said valve by its motion in the opposite direction, and means for moving said valve block within said chamber to vary the point at which said nullifying plunger begins and ends its movement.

14. In a liquid measuring and delivery device, the combination with a pump chamber having supply and delivery means, a valve block mounted in a bearing in said chamber to move therein, and a pump plunger movable into and out of said chamber, said valve block having a duct leading from inlet means of said chamber to the interior of said chamber, a valve, carried by said valve block, arranged to open and close said duct, and a nullifying plunger, also carried by said valve block and arranged to be encountered and moved back by said pump plunger during the inward stroke of the latter, and to follow said pump plunger during outward motion of the latter, said nullifying plunger arranged to open said valve by its motion in one direction and to close said valve by its motion in the opposite direction, said valve block having within it a space, normally out of communication with the interior of said chamber, into which said nullifying plunger retreats when moved back, and a duct connecting such space to the before mentioned duct of the valve block.

15. In combination, a plurality of liquid measuring and delivering devices each comprising a chamber having inlet and outlet means, a pump plunger movable into and out of said chamber, and means for nullifying varying displacement of such plunger due to its movement, during a portion of the stroke of said plunger, the relative cross-sections of the pump plungers of said measuring and delivering devices being different, said plungers being arranged for joint action.

16. In combination, a plurality of liquid measuring and delivering devices each comprising a chamber having inlet and outlet means, a pump plunger movable into and out of said chamber, and means for nullifying varying displacement of such plunger due to its movement, during a portion of the stroke of said plunger, said plungers being arranged for joint action, the points at which the nullifying means of the various devices begin to and cease from acting being different.

17. In combination, a plurality of liquid measuring and delivering devices each comprising a chamber having inlet and outlet means, a pump plunger movable into and out of said chamber, and means for nullifying varying displacement of such plunger due to its movement, during a portion of the stroke of said plunger, said plungers being arranged for joint action, the points at which the nullifying means of the various devices begin to and cease from acting being different, and means for varying simultaneously in the various devices the said points at which the nullifying means begin to and cease from acting.

In testimony whereof I have signed this specification in the presence of two subscribing witnesses.

ROBERTSON MATTHEWS.

Witnesses:
ALBERT W. SMITH,
WM. W. BARNARD.